US009134993B2

(12) United States Patent
Miyama et al.

(10) Patent No.: US 9,134,993 B2
(45) Date of Patent: Sep. 15, 2015

(54) INFORMATION PROCESSING APPARATUS, SERVER APPARATUS, INFORMATION PROCESSING METHOD, AND PROGRAM

(71) Applicant: SONY CORPORATION, Tokyo (JP)

(72) Inventors: Seiji Miyama, Kanagawa (JP); Masato Shimakawa, Kanagawa (JP); Tsugutomo Enami, Saitama (JP); Takashi Koyanagawa, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/319,220

(22) Filed: Jun. 30, 2014

(65) Prior Publication Data

US 2015/0040114 A1 Feb. 5, 2015

(30) Foreign Application Priority Data

Aug. 5, 2013 (JP) .................................. 2013-162145

(51) Int. Cl.
*G06F 9/44* (2006.01)
*G06F 9/445* (2006.01)
*G06F 17/30* (2006.01)

(52) U.S. Cl.
CPC ............ *G06F 8/65* (2013.01); *G06F 17/30309* (2013.01); *G06F 17/30575* (2013.01); *G06F 8/61* (2013.01); *G06F 8/67* (2013.01); *G06F 8/71* (2013.01)

(58) Field of Classification Search
CPC ............... G06F 8/61; G06F 8/65; G06F 8/67; G06F 8/68; G06F 8/71
See application file for complete search history.

(56) References Cited

U.S. PATENT DOCUMENTS

2004/0133887 A1* 7/2004 Herle et al. .................... 717/171
2004/0152455 A1* 8/2004 Herle .............................. 455/418
2005/0086654 A1* 4/2005 Sumi et al. ..................... 717/171

(Continued)

FOREIGN PATENT DOCUMENTS

JP 2006-113698 4/2006

OTHER PUBLICATIONS

Kliazovich et al., "Accounting for Load Variation in Energy-Efficient Data Centers", 2013 IEEE, ICC, Jun. 2013, pp. 1154-1159; <http://ieeexplore.ieee.org/stamp/stamp.jsp?tp=&arnumber=6654920>.*

(Continued)

*Primary Examiner* — Thuy Dao
*Assistant Examiner* — Ben C Wang
(74) *Attorney, Agent, or Firm* — Paratus Law Group, PLLC

(57) ABSTRACT

An information processing apparatus includes a communication unit, a storage, and a controller. The communication unit is capable of communicating with a server. The storage is capable of storing data used for predetermined processing. The controller is capable of controlling the communication unit to receive notification information from the server, the notification information containing current version information and updated version information, the current version information indicating a current version of the data, the updated version information indicating an updated version of the current version of the data, and acquire the updated version from a predetermined storage location after waiting for a standby time optionally determined within a predetermined maximum standby time. Further, the controller is capable of controlling the storage to update the stored data to the acquired updated version after an elapse of the maximum standby time.

9 Claims, 11 Drawing Sheets

(56) References Cited

U.S. PATENT DOCUMENTS

| | | | |
|---|---|---|---|
| 2007/0118617 A1* | 5/2007 | Lee et al. | 709/219 |
| 2007/0162565 A1* | 7/2007 | Hanselmann | 709/219 |
| 2007/0169083 A1* | 7/2007 | Penubolu et al. | 717/168 |
| 2008/0301660 A1* | 12/2008 | Rao et al. | 717/170 |
| 2008/0301667 A1* | 12/2008 | Rao et al. | 717/172 |
| 2008/0301668 A1* | 12/2008 | Zachmann | 717/173 |
| 2008/0301669 A1* | 12/2008 | Rao et al. | 717/173 |
| 2009/0144720 A1* | 6/2009 | Roush et al. | 717/171 |
| 2009/0187901 A1* | 7/2009 | Kanai | 717/173 |
| 2009/0260004 A1* | 10/2009 | Datta et al. | 717/175 |
| 2009/0328027 A1* | 12/2009 | Tsuchiya et al. | 717/171 |
| 2010/0011348 A1* | 1/2010 | Honma et al. | 717/168 |
| 2010/0082559 A1* | 4/2010 | Sumcad et al. | 717/173 |
| 2010/0255883 A1* | 10/2010 | Takahashi | 455/566 |
| 2013/0205288 A1* | 8/2013 | Sohm, Stefan | 717/168 |
| 2013/0326502 A1* | 12/2013 | Brunsman et al. | 717/178 |

OTHER PUBLICATIONS

Kolodziej et al., "Data Scheduling in Data Grids and Data Centers: A Short Taxonomy of Problems and Intelligent Resolution Techniques", Springer-Verlag Berlin Heidelberg, EIDWT, Sep. 2011, LNCS 7776, pp. 103-119; <http://link.springer.com/chapter/10.1007%2F978-3-642-38496-7_7#page-1>.*

Liu et al., "Data Center Demand Response: Avoiding the Coincident Peak via Workload Shifting and Local Generation", ACM, SIGMETRICS'13, Jun. 2013, pp. 341-342; <http://dl.acm.org/results.cfm?h=1&source_query=&&cfid=511364938&cftoken=39209020>.*

* cited by examiner

INFORMATION PROCESSING APPARATUS, SERVER APPARATUS, INFORMATION PROCESSING METHOD, AND PROGRAM

CROSS REFERENCE TO RELATED APPLICATIONS

This application claims the benefit of Japanese Priority Patent Application JP 2013-162145 filed Aug. 5, 2013, the entire contents of which are incorporated herein by reference.

BACKGROUND

The present disclosure relates to an information processing apparatus capable of storing data and receiving the updated version of the data, a server apparatus, and an information processing method and a program for the information processing apparatus.

Techniques of related art that update data (software or the like) stored in a plurality of devices include a technique in which a server over a cloud network stores update data and broadcast the update data to each of the devices at a predetermined time, a technique in which a server prompts each of the devices to access the server at a predetermined time and download update data, and the like.

In the case where the data of the respective devices are concurrently updated at the predetermined time, however, there is a possibility that the load on the server or a network connected to the server instantaneously increase.

In terms of such a problem, Japanese Patent Application Laid-open No. 2006-113698 discloses the following content providing system. In the content providing system, time-width information for dispersing a time at which a user terminal acquires updated content from a server is set for content information, the content information is transmitted to the user terminal, and the user terminal acquires content at the time set based on the content information. Consequently, the load on the server due to the concentration of access can be reduced.

SUMMARY

In the technique disclosed in Japanese Patent Application Laid-open No. 2006-113698, the updated content is acquired by user terminals and reproduced immediately after the acquisition at different times in accordance with the respective acquisition timings. Thus, the updated content does not have to be stored in each of the user terminals. However, even in the system in which the use of the updated data has to be started around the same time among a plurality of devices, it is desirable for the devices to acquire the data in advance at different times in order to reduce the load on the server.

In view of the circumstances as described above, there is a need for providing an information processing apparatus, a server apparatus, an information processing method, and a program that are capable of reducing the load on a server due to the concentration of access even when a plurality of devices start using updated data distributed from the server around the same time.

According to an embodiment of the present disclosure, there is provided an information processing apparatus including a communication unit, a storage, and a controller.

The communication unit is capable of communicating with a server. The storage is capable of storing data used for predetermined processing.

The controller is capable of controlling the communication unit to receive notification information from the server, the notification information containing current version information and updated version information, the current version information indicating a current version of the data, the updated version information indicating an updated version of the current version of the data, and acquire the updated version from a predetermined storage location after waiting for a standby time optionally determined within a predetermined maximum standby time.

Further, the controller is capable of controlling the storage to update the stored data to the acquired updated version after an elapse of the maximum standby time.

With this configuration, even when a plurality of devices start using the updated data distributed from the server around the same time, the information processing apparatus can acquire the updated data at an optional time within the maximum standby time and retain the updated data after the elapse of the maximum standby time without using the updated data. This allows the loads of the server and a network due to the concentration of access to be reduced.

The notification information may contain maximum standby time information indicating the maximum standby time. In this case, the controller may be capable of optionally determining the standby time within the maximum standby time. Further, the controller may be capable of controlling the communication unit to receive update request information from the server after the elapse of the maximum standby time, the update request information requesting an update of the data, and controlling the storage to update the data to the updated version based on the update request information.

With this configuration, the information processing apparatus can retain the acquired updated data without executing the update until the update request information is received from the server.

The notification information may contain update time information indicating an update time of the updated version. In this case, the controller may be capable of controlling the storage to update the data to the updated version when the update time comes.

With this configuration, the information processing apparatus can retain the acquired updated data without executing the update until the update time comes.

The controller may be capable of controlling the communication unit to receive the current version information from the server at a time of connection to the server next time, when the update request information fails to be received from the server because of being unconnected to the server. Further, the controller may be capable of comparing the version indicated by the current version information with a version of the data stored in the storage, and may be capable of controlling the communication unit to acquire the version of the data, the version being indicated by the current version information, from the storage location when the versions are different from each other. Furthermore, the controller may be capable of controlling the storage to update the stored data by the acquired version.

With this configuration, even when the information processing apparatus fails to receive the update request information from the server due to the power-off, for example, the information processing apparatus can confirm the current version of the data at the time of the next activation, and if the current version differs, can immediately acquire and update the version.

The controller may be capable of controlling the communication unit to acquire the current version of the data from the storage location, when the information processing apparatus is activated and the storage does not store the data.

With this configuration, even at the time of the initial activation of the information processing apparatus or even when the data of the storage is deleted for some reasons, the information processing apparatus can acquire the current version of the data and thus acquire its updated version as well by receiving the notification information.

The server may include a relay server configured to relay communication between the information processing apparatus and a plurality of other apparatuses, the relay server including a plurality of relay servers, and the data may include data indicating switching of a relay server to be connected for relay by the information processing apparatus, among the plurality of relay servers.

With this configuration, the information processing apparatus acquires data on the switching of the relay server to which the information processing apparatus is to be connected, at an optional time prior to a switching timing. This can prevent an increase in load on the relay server due to data requests transmitted from many apparatuses around the same time.

The controller may be capable of controlling the communication unit to receive information on a plurality of updated versions as the updated version information, the information on the plurality of updated versions containing at least information indicating an updated version of the current version of the data and information indicating a further updated version of the updated version. In this case, the controller may be capable of controlling the storage to update the data to the updated version after the elapse of different maximum standby times set for the respective updated versions.

With this configuration, the information processing apparatus stores the information on the plurality of updated versions in advance. This allows the load on the server to be further reduced.

According to another embodiment of the present disclosure, there is provided a server apparatus including a communication unit and a controller.

The communication unit is capable of communicating with a plurality of information processing apparatuses.

The controller is capable of controlling the communication unit to transmit notification information to the plurality of information processing apparatuses, the notification information containing current version information and updated version information, the current version information indicating a current version of data used for predetermined processing in the plurality of information processing apparatuses, the updated version information indicating an updated version of the current version of the data, the notification information making a notification of acquisition of the updated version after waiting for an optional standby time within a predetermined maximum standby time.

Further, the controller is capable of controlling the communication unit to transmit update request information to the plurality of information processing apparatuses after an elapse of the maximum standby time, the update request information requesting an update of the data by the updated version.

With this configuration, the server apparatus disperses the timings at which the information processing apparatuses access the storage location in order to acquire the updated version of the data. This allows the loads on the server apparatus, the storage location, and the network to be reduced.

According to still another embodiment of the present disclosure, there is provided an information processing method including: receiving notification information containing current version information and updated version information, the current version information indicating a current version of data used for predetermined processing, the updated version information indicating an updated version of the current version of the data; acquiring the updated version from a predetermined storage location after waiting for a standby time optionally determined within a predetermined maximum standby time; and updating the stored data to the updated version of the data after an elapse of the maximum standby time.

According to still another embodiment of the present disclosure, there is provided a program causing an information processing apparatus to execute: receiving notification information containing current version information and updated version information, the current version information indicating a current version of data used for predetermined processing, the updated version information indicating an updated version of the current version of the data; acquiring the updated version from a predetermined storage location after waiting for a standby time optionally determined within a predetermined maximum standby time; and updating the stored data to the updated version of the data after an elapse of the maximum standby time.

As described above, according to the present disclosure, it is possible to reduce the load on the server due to the concentration of access even when a plurality of devices start using updated data distributed from the server around the same time.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

[General Outline of System]

Figure 1:
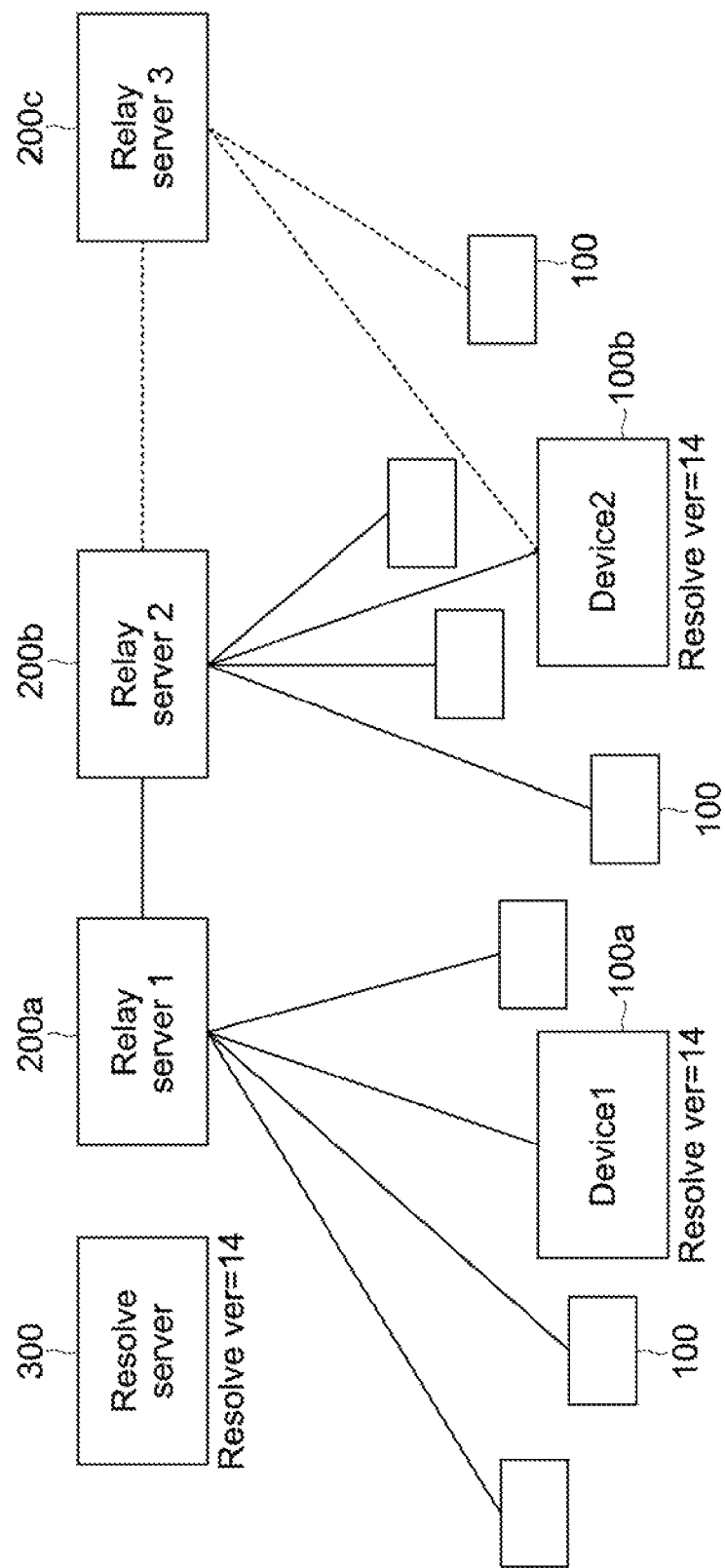
FIG. 1 is a diagram showing the general outline of a system according to an embodiment of the present disclosure.

FIG. 1 is a diagram showing the general outline of a communication system according to this embodiment.

As shown in FIG. 1, the system according to this embodiment includes a plurality of devices 100 (100a, 100b), a plurality of relay servers 200 (200a, 200b, 200c) over a cloud network (Internet), and a Resolve server 300. The number of devices 100 and relay servers 200 is not limited to the number shown in FIG. 1.

Each of the devices 100 can communicate with the relay server 200 and with another device 100 via the relay server 200. A relay server 200 to be connected is assigned to each device 100. For example, the device 100a is connected to the relay server 200a, and the device 100b is connected to the relay server 200b. Further, in order to reduce the load on the relay servers 200, each of the devices 100 performs P2P (Peer to Peer) direct communication by UPnP (Universal Plug and Play), for example, if possible.

Here, each of the devices 100 may be any device such as a smartphone, a desktop PC (personal computer), a laptop PC, a tablet, a BDR (Blu-ray (registered trademark) Recorder), a TV, a storage device, a game device, or an audio device.

Each of the relay servers 200 relays communication between the devices 100 to be managed and manages connection between the devices 100. Each relay server 200 is installed for each connection of a predetermined number of devices 100, which may be several tens of thousands of or several millions of connection, for example. Each relay server 200 can communicate with another relay server 200 and the Resolve server 300.

The relay server 200 stores connection information (IP address, port number, and the like) of each device 100 in association with its device ID and the like for identifying the device.

In the case where the devices 100 communicate via the relay server 200, each of the devices 100 designates its own ID and a transmission destination ID and transmits a message to the relay server 200. The relay server 200 transfers the message to a device having the transmission destination ID based on those IDs.

The Resolve server 300 stores data indicating to which of the relay servers 200 each of the devices 100 is to be connected (hereinafter, referred to as Resolve data). Each device 100 receives the Resolve data from the Resolve server 300 prior to connection to the relay server 200.

The Resolve data is appropriately updated in accordance with situations, for example, in the case where a new relay server 200 is installed or the environment of the devices 100 is changed. For example, in FIG. 1, the current version of the Resolve data is ver=14, but there is a situation where a relay server 200c is additionally installed and the relay server 200 to which some devices 100 including the device 100b and the like are to be connected is changed, specifically, switched from the relay server 200b to the relay server 200c.

In this case, the version of the Resolve data is updated from ver=14 to ver=15. In this embodiment, the following mechanism is provided: all of devices 100 acquire the updated Resolve data, and devices 100, which detect that a relay server 200 to be connected by those devices 100 has been switched, change the relay server 200 to be connected.

The switching of the relay server 200 to be connected (Resolve data) is switching processing of a network configuration for all of the devices 100, so it is assumed that all of the devices 100 execute the switching processing around the same time. When the devices 100 access the Resolve server 300 all together and acquire the Resolve data at the timing of the switching, however, the loads on the Resolve server 300 and a network connected to the Resolve server 300 increase. In this embodiment, a system capable of reducing those loads is provided while considering the above-mentioned assumption.

[Hardware Configuration of Device]

Figure 2:
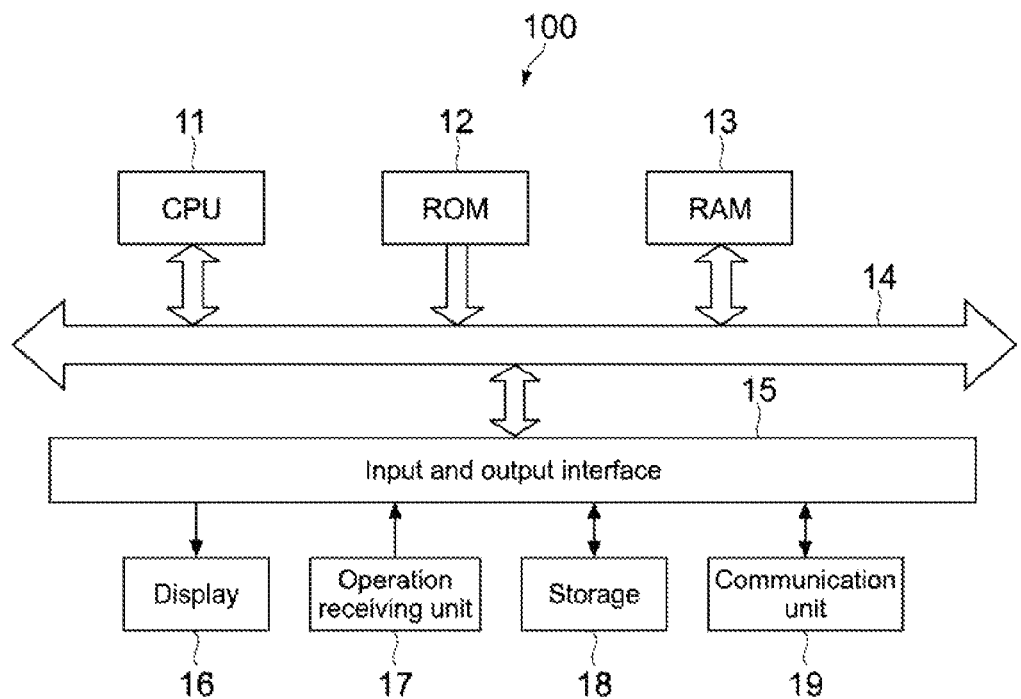
FIG. 2 is a diagram showing a hardware configuration of a device of the system.

FIG. 2 is a diagram showing a hardware configuration of the device 100. As shown in FIG. 2, the device 100 includes a CPU (Central Processing Unit) 11, a ROM (Read Only Memory) 12, a RAM (Random Access Memory) 13, an input and output interface 15, and a bus 14 for connecting those components.

The CPU 11 accesses the RAM 13 and the like when necessary and performs overall control of the whole of the blocks of the device 100 while performing various types of computation processing. The ROM 12 is a non-volatile memory in which an OS to be executed by the CPU 11 and firmware such as a program and various parameters are fixedly stored. The RAM 13 is used as a work area or the like of the CPU 11 and temporarily stores the OS, various applications being executed, and various types of data being processed.

A display 16, an operation receiving unit 17, a storage 18, a communication unit 19, and the like are connected to the input and output interface 15.

The display 16 is a display device using, for example, an LCD (Liquid Crystal Display), an OELD (Organic ElectroLuminescence Display), a CRT (Cathode Ray Tube), or the like.

The operation receiving unit 17 is an input apparatus including a touch panel, a keyboard, a button, and the like. In the case where the operation receiving unit 17 is a touch panel, the touch panel is integrated with the display 16.

The storage 18 is a non-volatile memory such as a flash memory (SSD; Solid State Drive) or any other solid-state memory. The storage 18 stores the OS, the Resolve data acquired from the Resolve server 300, data such as update notification information received from the relay server 200, various types of software necessary to update the Resolve data based on those above pieces of data, and the like.

The communication unit 19 is a module for connecting to the network and performs communication processing between the relay server 200, the Resolve server 300, and other devices 100.

[Hardware Configuration of Relay Server]

Figure 3:
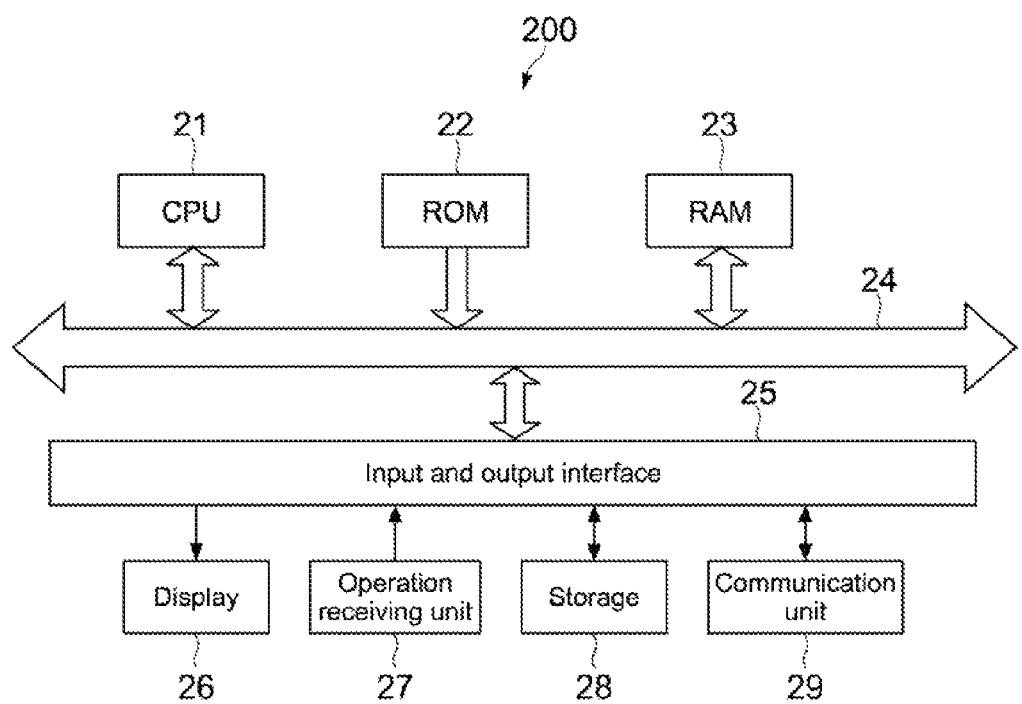
FIG. 3 is a diagram showing a hardware configuration of a relay server of the system.

FIG. 3 is a diagram showing a hardware configuration of the relay server 200. As shown in FIG. 3, the hardware configuration of the relay server 200 is basically the same as the hardware configuration of the device 100. Specifically, the relay server 200 includes a CPU 21, a ROM 22, a RAM 23, an input and output interface 25, a bus 24 for connecting those components, a display 26, an operation receiving unit 27, a storage 28, and a communication unit 29. Here, the display 26 may be externally connected to the relay server 200. Further, an HDD (Hard Disk Drive) may be used as the storage 28.

The CPU 21 controls the blocks such as the storage 28 and the communication unit 29 and executes processing of communication with the devices 100 and various types of data processing.

The storage 28 stores various types of software for relaying and managing the communication between the devices 100, various types of software necessary for update notification processing and the like of the Resolve data stored in the Resolve server 300 for the devices 100, and various types of data such as data on the version of the Resolve data.

The communication unit 29 is a NIC (Network Interface Card) for the Ethernet (registered trademark), for example, and performs communication processing between the devices 100, the Resolve server 300, and other relay servers 200.

[Software Configuration of System]

Figure 4:
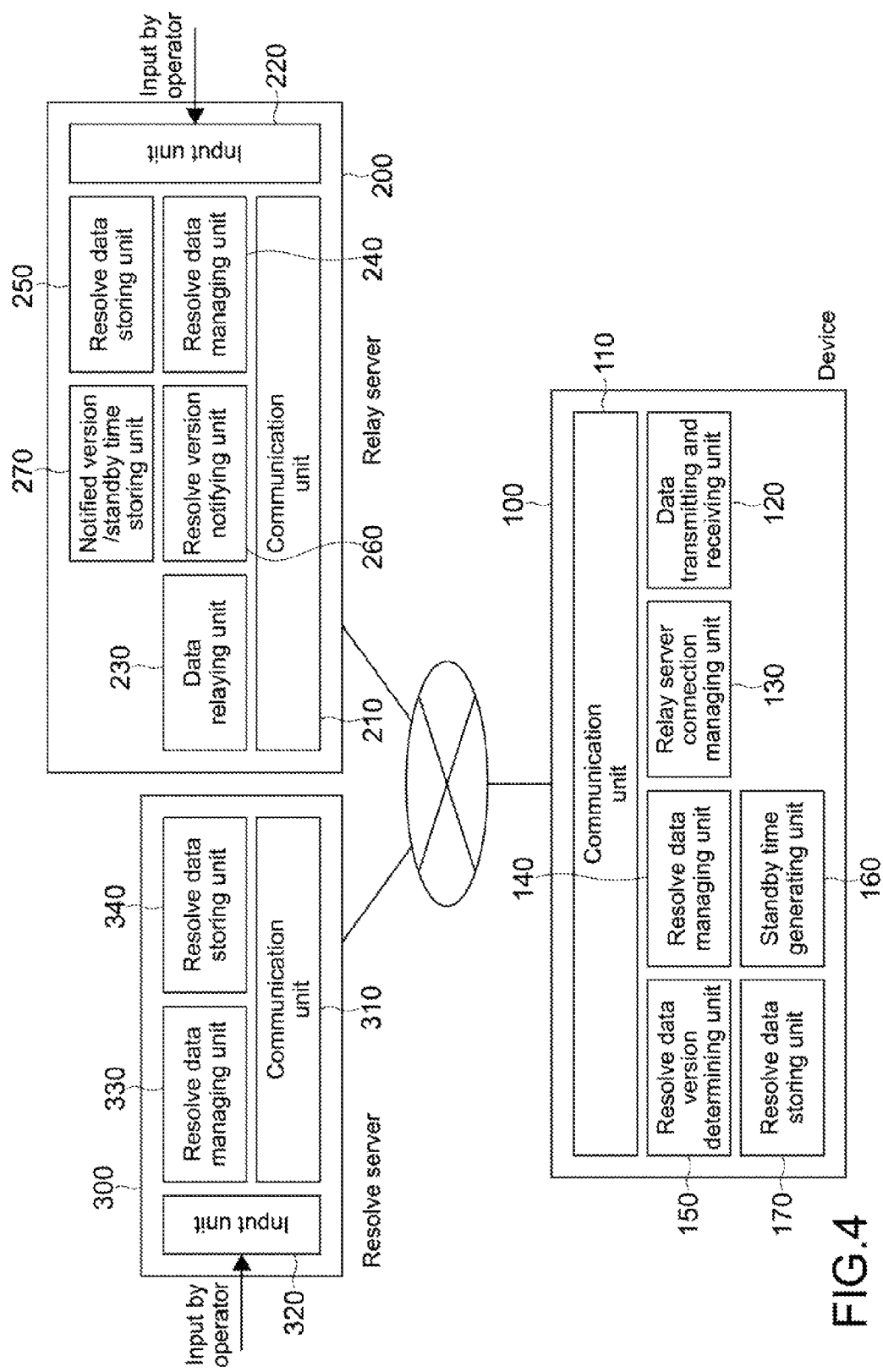
FIG. 4 is a diagram showing configurations of software modules of the device, the relay server, and a Resolve server of the system.

FIG. 4 is a diagram showing configurations of software modules of the device 100, the relay server 200, and the Resolve server 300.

As shown in FIG. 4, the device 100 includes modules of a communication unit 110, a data transmitting and receiving unit 120, a relay server connection managing unit 130, a Resolve data managing unit 140, a Resolve data version determining unit 150, a standby time generating unit 160, and a Resolve data storing unit 170.

The communication unit 110 performs overall control on the communication with the relay server 200 and the Resolve server 300.

The data transmitting and receiving unit 120 transmits and receives various types of data between other devices 100, the relay server 200, and the Resolve server 300.

The relay server connection managing unit 130 manages processing of connecting to the relay server 200, processing of keeping the connection after establishment of the connection, and the like.

The Resolve data managing unit 140 stores the Resolve data acquired from the Resolve server 300 in the Resolve data storing unit 170 and manages information on the Resolve data and its version. Further, the Resolve data managing unit 140 updates those pieces of information based on an update notification from the relay server 200.

The Resolve data storing unit 170 stores the Resolve data acquired from the Resolve server 300.

The Resolve data version determining unit 150 determines the current version ("current") of the Resolve data and the version ("future") after the update thereof based on the information managed by the Resolve data managing unit 140.

When receiving an update notification of the Resolve data from the relay server 200, the standby time generating unit 160 generates an optional standby time within the maximum standby time before the acquisition of the Resolve data from the Resolve server 300, the optional standby time being designated by the update notification.

The relay server 200 includes modules of a communication unit 210, an input unit 220, a data relaying unit 230, a Resolve data managing unit 240, a Resolve data storing unit 250, a Resolve version notifying unit 260, and a notified version/standby time storing unit 270.

The communication unit 210 performs overall control on communication processing with the devices 100, the Resolve server 300, and other relay servers 200.

The input unit 220 receives an operation input from the administrator of the relay server 200.

The data relaying unit 230 relays data communication between the devices 100 to be managed.

The Resolve data managing unit 240 stores the Resolve data received from the Resolve server 300 in the Resolve data storing unit 250 and manages the received Resolve data.

The Resolve data storing unit 250 stores the Resolve data received from the Resolve server 300.

The Resolve version notifying unit 260 notifies each of the devices 100, which are to be managed by the relay server 200, of the versions (current version and updated version) of the Resolve data.

The notified version/standby time storing unit 270 stores version information of the Resolve data, which is transmitted to the devices 100, and stores information on the maximum standby time for notification. The maximum standby time is used for the devices 100 to wait from the reception of the update notification of the Resolve data to the acquisition of the update version of the Resolve data.

Here, the maximum standby time is, for example, three days or one week, but is not limited thereto.

The Resolve server 300 includes modules of a communication unit 310, an input unit 320, a Resolve data managing unit 330, and a Resolve data storing unit 340.

The communication unit 310 performs overall control on communication processing with the devices 100 and the relay servers 200.

The input unit 320 receives an operation input from the administrator of the Resolve server 300.

The Resolve data managing unit 330 stores the Resolve data (current version and updated version) in the Resolve data storing unit 340 and manages the Resolve data.

The Resolve data storing unit 340 stores the Resolve data.

[Operation of System]

Next, description will be given on the operations of the device 100 and the relay server 200 in the system configured as described above. In this embodiment, the operations of the device 100 and the relay server 200 are performed in cooperation of the CPUs 11 and 12 with the software executed under the control of the CPUs 11 and 12.

(Operation of Device at Initial Activation)

First, description will be given on the operation of the device 100 at the time of initial activation.

Here, technically, the phrase "at the time of initial activation" refers to a state where the device 100 does not have the Resolve data. Specifically, the phrase "at the time of initial activation" includes not only a state where the device 100 is turned on for the first time after factory shipment but also a state where the Resolve data is acquired but deleted for any reason and then the device 100 is activated for the first time, for example.

First, at the time of initial activation, the device 100 accesses the Resolve server 300 and acquires the Resolve data. In this case, the device 100 is unable to obtain the current version number of the Resolve data, and thus requests the Resolve server 300 to transmit "Resolve data currently in operation".

(Information Distributed by Resolve Server)

Next, description will be given on data distributed by the Resolve server 300, including the Resolve data.

As described above, the Resolve data, specifically, data on the relay server 200 to be connected (address data) is distributed to each device 100.

The address data of all of the relay servers 200 and the data indicating to which relay server 200 each device 100 is to be connected are distributed to the relay servers 200.

The Resolve server 300 is used as an HTTP (Hypertext Transfer Protocol) server and switches a URL to be returned, depending on whether the data acquisition request source is the device 100 or the relay server 200. Specifically, the device 100 and the relay server 200 use different URLs.

For example, the following URL is returned to each relay server 200.

http://example.com/srv?ver=14

This is a URL in the case where the Resolve data of ver=14 is returned.

On the other hand, the following URL is returned to each device 100.

http://example.com/dev?ver=15

This is a URL in the case where the Resolve data of ver=15 is returned.

Additionally, as described above, at the time of initial activation of the device 100, the Resolve data currently in operation is returned. An example of the Resolve data in such a case is as follows.

http://example.com/dev?ver=current (Connection Processing to Relay Server by Device)

Next, description will be given on the operation at the time of connection to the relay server 200 by the devices 100.

Figure 5:
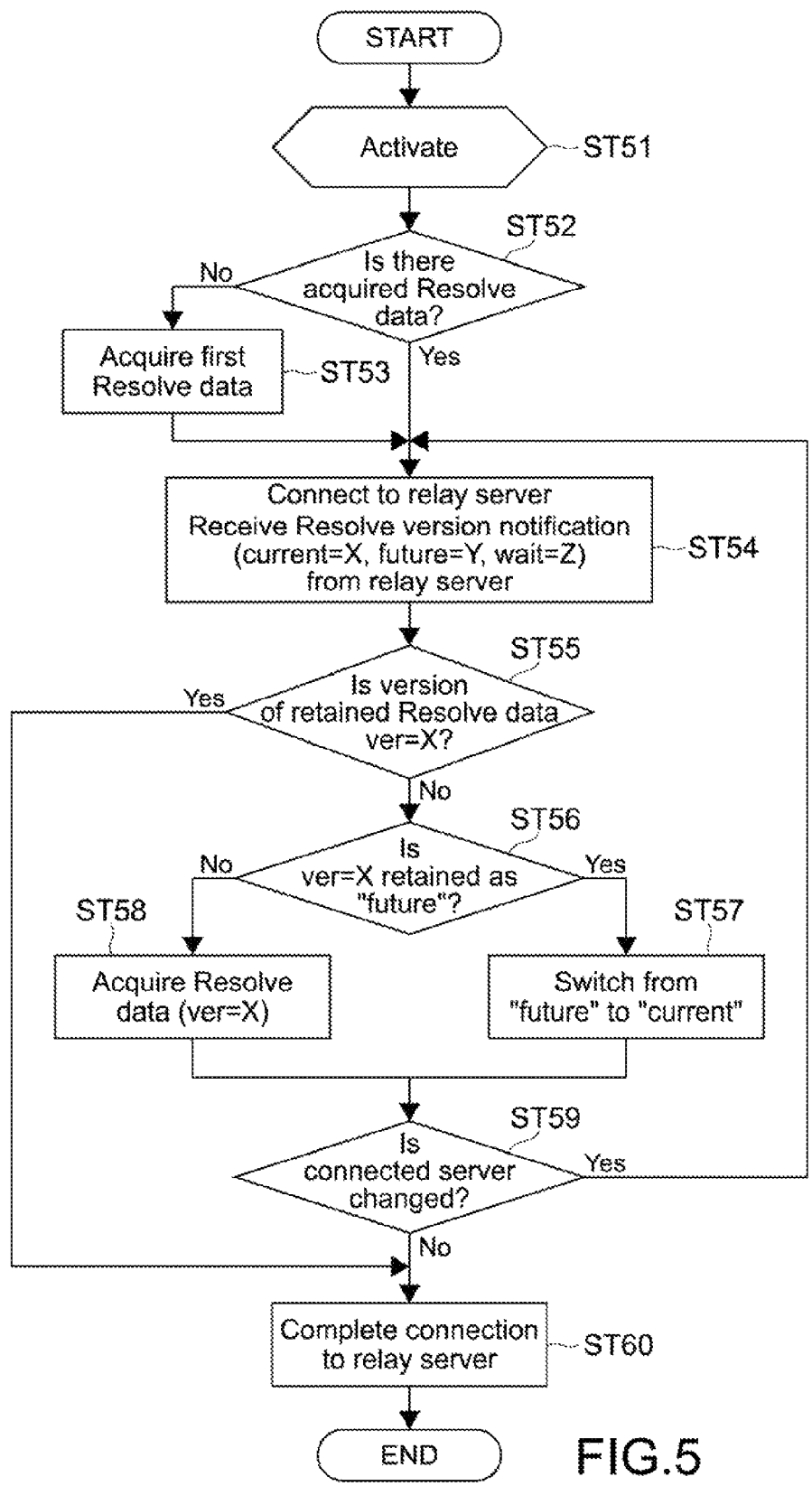
FIG. 5 is a flowchart showing the flow of an operation of the device when connected to the relay server.

FIG. 5 is a flowchart showing the flow of an operation when the device 100 is activated and then connected to the relay server 200.

As shown in FIG. 5, first, when the device 100 is activated (Step 51), the Resolve data managing unit 140 determines whether there is acquired Resolve data or not (Step 52).

When there is no acquired Resolve data (No), that is, at the time of initial activation, the Resolve data managing unit 140 acquires the Resolve data currently in operation from the Resolve server 300 as described above (Step 53).

When there is acquired Resolve data (Yes), the relay server connection managing unit 130 connects to the relay server 200 by using a URL indicated by the Resolve data (Step 54).

In such a manner, the device 100 receives a version notification of the Resolve data from the relay server 200. The version notification contains current version information (URL) (current=X) of the Resolve data, version information (URL) after update (future=Y), and maximum standby time information (wait=Z) that elapses before the acquisition of the version after update.

Subsequently, the Resolve data version determining unit 150 determines whether the version of the Resolve data, which is currently retained as "current" in the Resolve data storing unit 170, is the received ver=X or not (Step 55).

When the version of the retained Resolve data is the ver=X (Yes), it is unnecessary to update the Resolve data at the present moment. The relay server connection managing unit 130 completes the connection to the relay server 200 (Step 60).

On the other hand, when the version of the retained Resolve data is not the ver=X, the Resolve data version determining unit 150 determines whether the Resolve data of ver=X is retained as "future" or not (Step 56).

Here, the case where the Resolve data of ver=X is retained as "future" includes, for example, a case where the device 100 acquires the Resolve data of ver=X as "future" and then enters a sleep mode without executing the switching processing of the Resolve data.

When the Resolve data of ver=X is retained as "future" (Yes), the Resolve data managing unit 140 switches the status of the Resolve data of ver=X from "future" to "current" (Step 57).

On the other hand, when the Resolve data of ver=X is not retained as "future" (No), the Resolve data managing unit 140 acquires the Resolve data of ver=X for "current" from the Resolve server 300 by using the received URL (Step 58).

Subsequently, the relay server connection managing unit 130 determines whether the relay server 200 to be connected is changed or not, based on the Resolve data of ver=X (Step 59).

When the relay server 200 to be connected is changed (Yes), the relay server connection managing unit 130 returns to Step 54 and connects to a new relay server 200.

When the relay server 200 to be connected is not changed (No), the relay server connection managing unit 130 completes the connection with the relay server 200, which is the current connection destination (Step 60).

(Acquisition Processing of Resolve Data for Update)

Next, description will be given on acquisition processing of Resolve data for "future" by the device 100.

Figure 6:
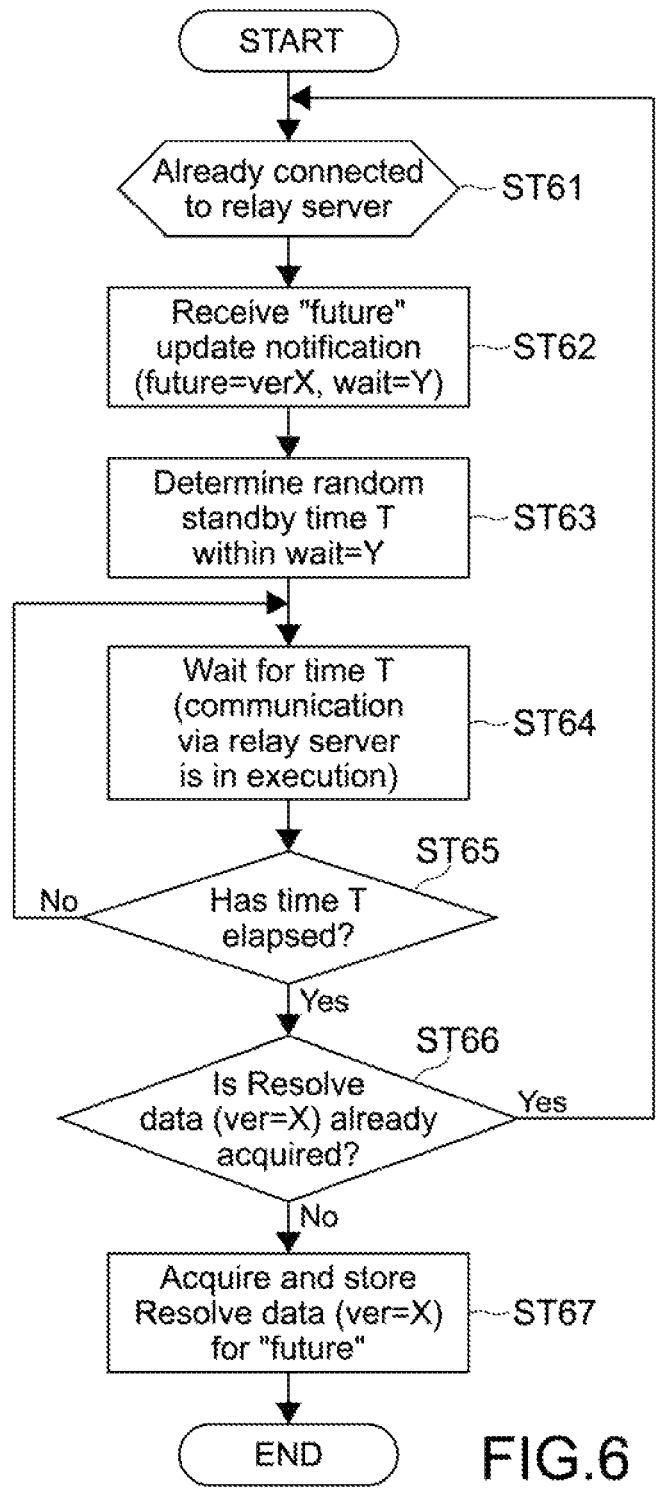
FIG. 6 is a flowchart showing the flow of an operation of the device to receive a Resolve data update notification from the relay server and acquire Resolve data.
Figure 7:
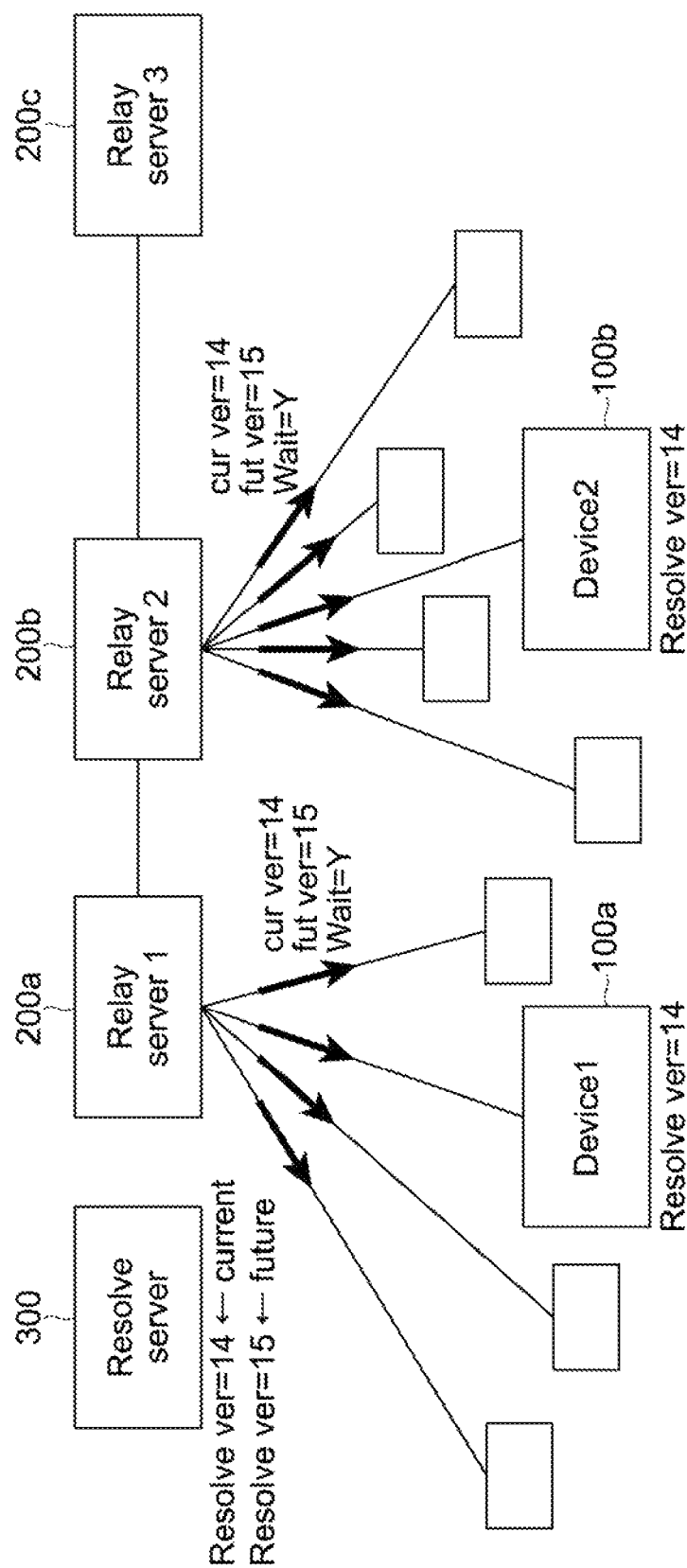
FIG. 7 is a diagram conceptually showing processing of the relay server to transmit the Resolve data update notification to the device.
Figure 8:
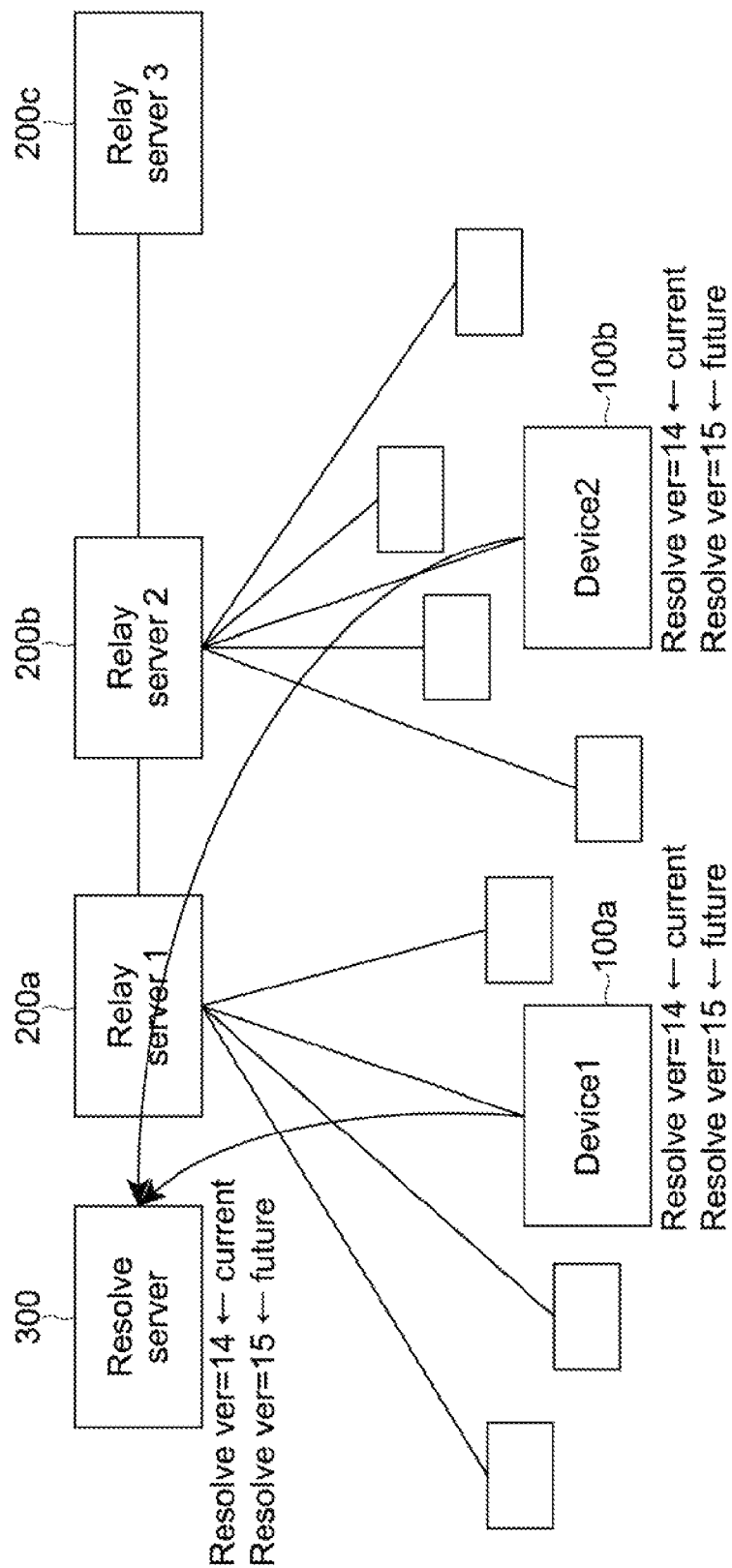
FIG. 8 is a diagram conceptually showing processing of the device to acquire Resolve data.

FIG. 6 is a flowchart showing the flow of an operation of the device 100 to receive a Resolve data update notification from the relay server 200 and acquire updated Resolve data. FIG. 7 is a diagram conceptually showing processing of the relay server 200 to transmit the Resolve data update notification to the device 100. FIG. 8 is a diagram conceptually showing processing of the device 100 to acquire Resolve data.

As shown in FIG. 6, first, the relay server connection managing unit 130 of the device 100, which is already connected to the relay server 200 (Step 61), receives a Resolve data update notification from the relay server 200 (Step 62). The update notification contains version information (URL) (future=verX) after update and maximum standby time information (wait=Y).

In the example of FIG. 7, with the devices 100 retaining the Resolve data of ver=14, an update notification containing a current version (current ver=14), a version after update (future ver=15), and maximum standby time information is transmitted from each relay server 200 to the devices 100.

Subsequently, the standby time generating unit 160 determines a random standby time T within the maximum standby time (wait=Y) (Step 63).

Subsequently, the Resolve data managing unit 140 waits until the time T elapses (Steps 64 and 65). During the waiting, the communication via the relay server 200 is executed.

When determining that the time T has elapsed (Yes of Step 65), the Resolve data managing unit 140 determines whether the Resolve data of ver=X described above is already acquired or not (Step 66).

When determining that the Resolve data of ver=X described above is not already acquired (No), the Resolve data managing unit 140 acquires the Resolve data of ver=X from the Resolve server 300 and stores the Resolve data of ver=X for "future" in the Resolve data storing unit 170 (Step 67).

The example of FIG. 8 shows that each device 100 acquires the Resolve data of ver=15, which is used for "future", from the Resolve server 300 and thus that Resolve data is stored as Resolve data for "future". After the acquisition of the Resolve data of ver=15 to be used for "future", each device 100 operates with the Resolve data of ver=14 until a switching notification that will be described later is received.

(Switching Processing of Resolve Data)

Next, description will be given on switching processing of the acquired Resolve data for update.

Figure 9:
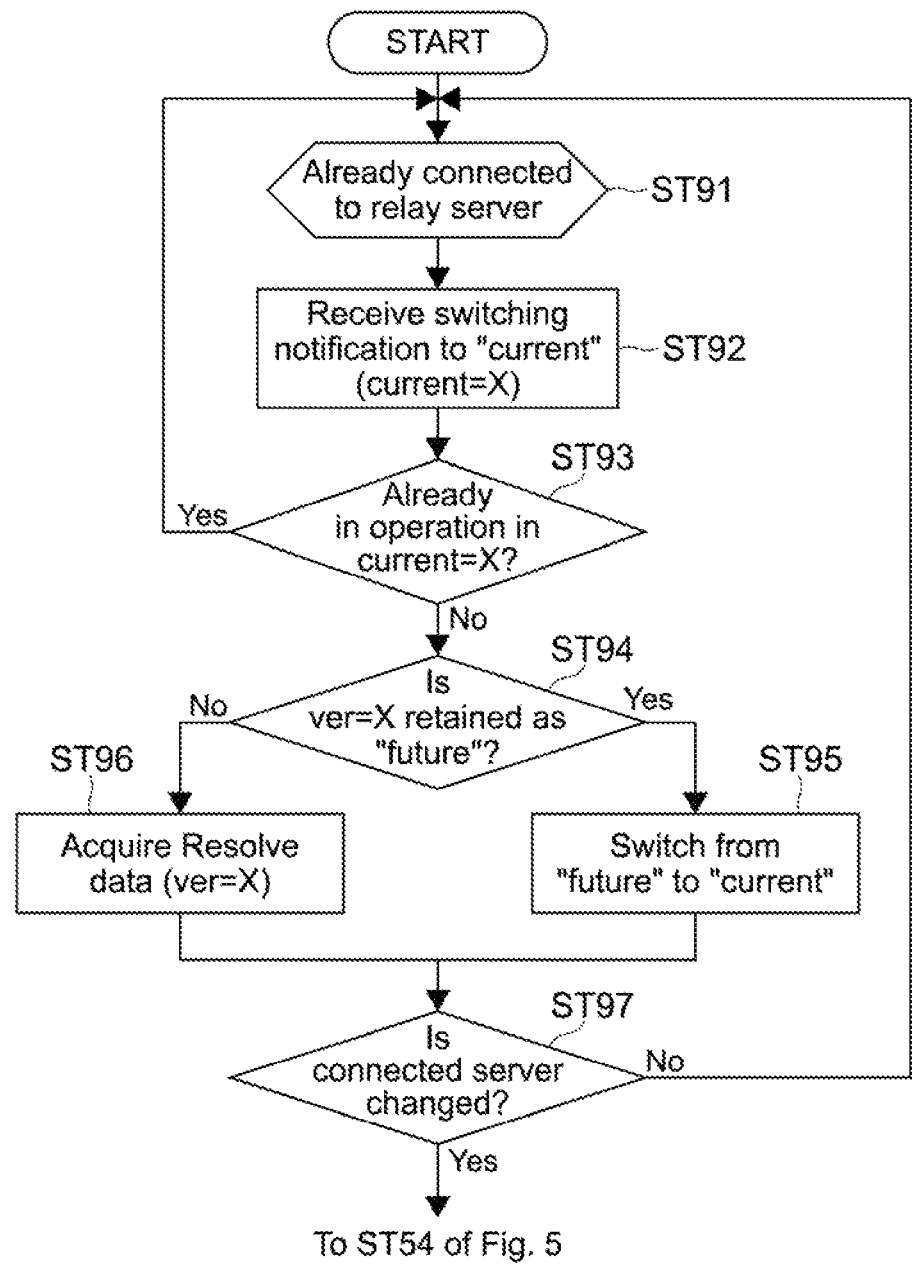
FIG. 9 is a flowchart showing the flow of processing of the device to switch the Resolve data to an updated version.
Figure 10:
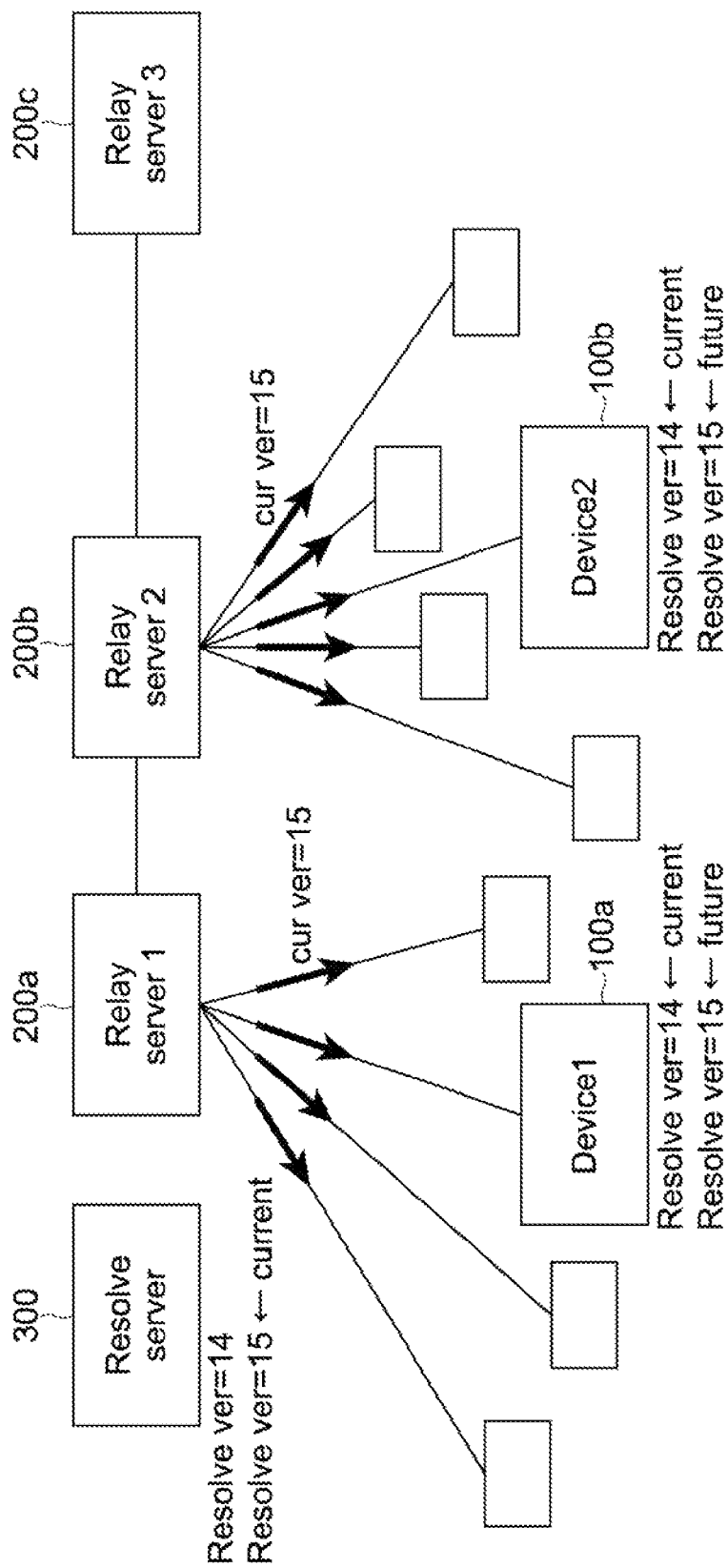
FIG. 10 is a diagram conceptually showing processing of the relay server to transmit a switching notification of the Resolve data to the device.
Figure 11:
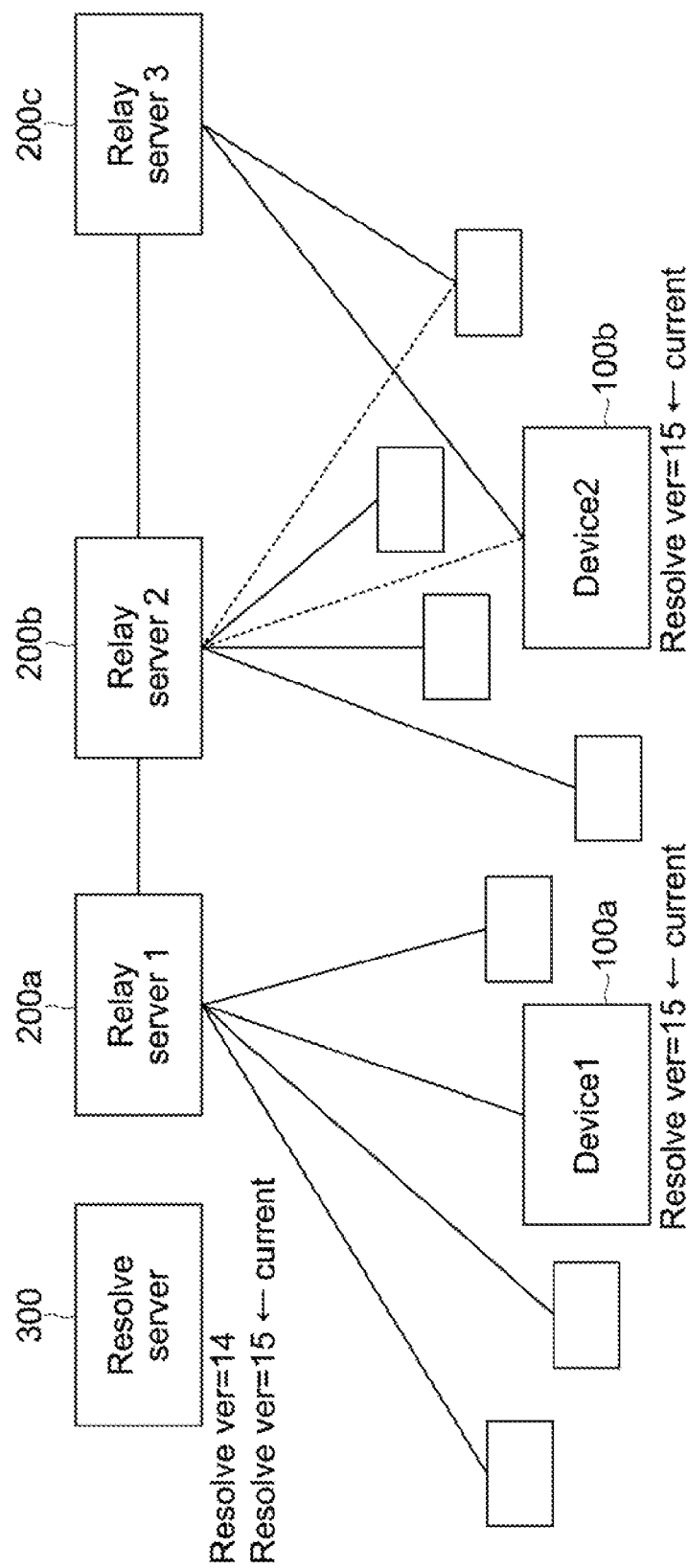
FIG. 11 is a diagram conceptually showing processing of the device to switch the Resolve data.

FIG. 9 is a flowchart showing the flow of switching processing of the device 100 to switch the Resolve data to its updated version. FIG. 10 is a diagram conceptually showing processing of the relay server 200 to transmit a switching notification of the Resolve data to each device 100. FIG. 11 is a diagram conceptually showing processing of each device 100 to switch the Resolve data.

As shown in FIG. 9, first, the relay server connection managing unit 130 of the device 100, which is already connected to the relay server 200 (Step 91), receives a switching notification (update request) from the relay server 200 (Step 92). The switching notification (update request) is a request for switching (updating) the Resolve data for "future" (future=X) as Resolve data for "current" (current=X).

The switching notification is transmitted after all of the devices 100 acquire the Resolve data for "future", that is, after the elapse of the maximum standby time.

In the example of FIG. 10, with each device 100 retaining the Resolve data of ver=14 for "current" and the Resolve data of ver=15 for "future", a request to switch to the Resolve data of ver=15 for "current" is transmitted from the relay servers 200.

Subsequently, the Resolve data version determining unit 150 determines whether or not the device 100 is already in operation in the state of the current=X of the Resolve data (Step 93).

When determining that the device 100 is already in operation in the state of the current=X of the Resolve data (Yes), the switching of the Resolve data is unnecessary, and thus the relay server connection managing unit 130 continues the connection with the relay server 200 without change.

When determining that the device 100 is not in operation in the state of the current=X of the Resolve data (No), the Resolve data version determining unit 150 determines whether the Resolve data of ver=X is retained as the Resolve data for "future" or not (Step 94).

When determining that the Resolve data of ver=X is retained as the Resolve data for "future" (Yes), the Resolve data managing unit 140 switches the status of that Resolve data from "future" to "current" (Step 95).

When determining that the Resolve data of ver=X is not retained as the Resolve data for "future" (No), the Resolve data managing unit 140 acquires the Resolve data of ver=X as Resolve data for "current" from the Resolve server 300 (Step 96).

Subsequently, the relay server connection managing unit 130 determines whether the relay server 200 to be connected is changed or not, based on the Resolve data of ver=X described above (Step 97).

When the relay server 200 to be connected is changed (Yes), the relay server connection managing unit 130 connects to a new relay server 200 by the processing of Step 54 shown in FIG. 5.

The example of FIG. 11 shows that each device 100 switches the status of the Resolve data of ver=15 to "current". The example of FIG. 11 also shows that by this switching, for example, the relay server 200 that is to be connected by the device 100*b* is changed from the relay server 200*b* to the relay server 200*c* and a new connection to the relay server 200*c* is established.

(Countermeasures when Device Fails to Receive Switching Notification)

Next, description will be given on countermeasures when the device 100 fails to receive a switching notification of the Resolve data.

Figure 12:
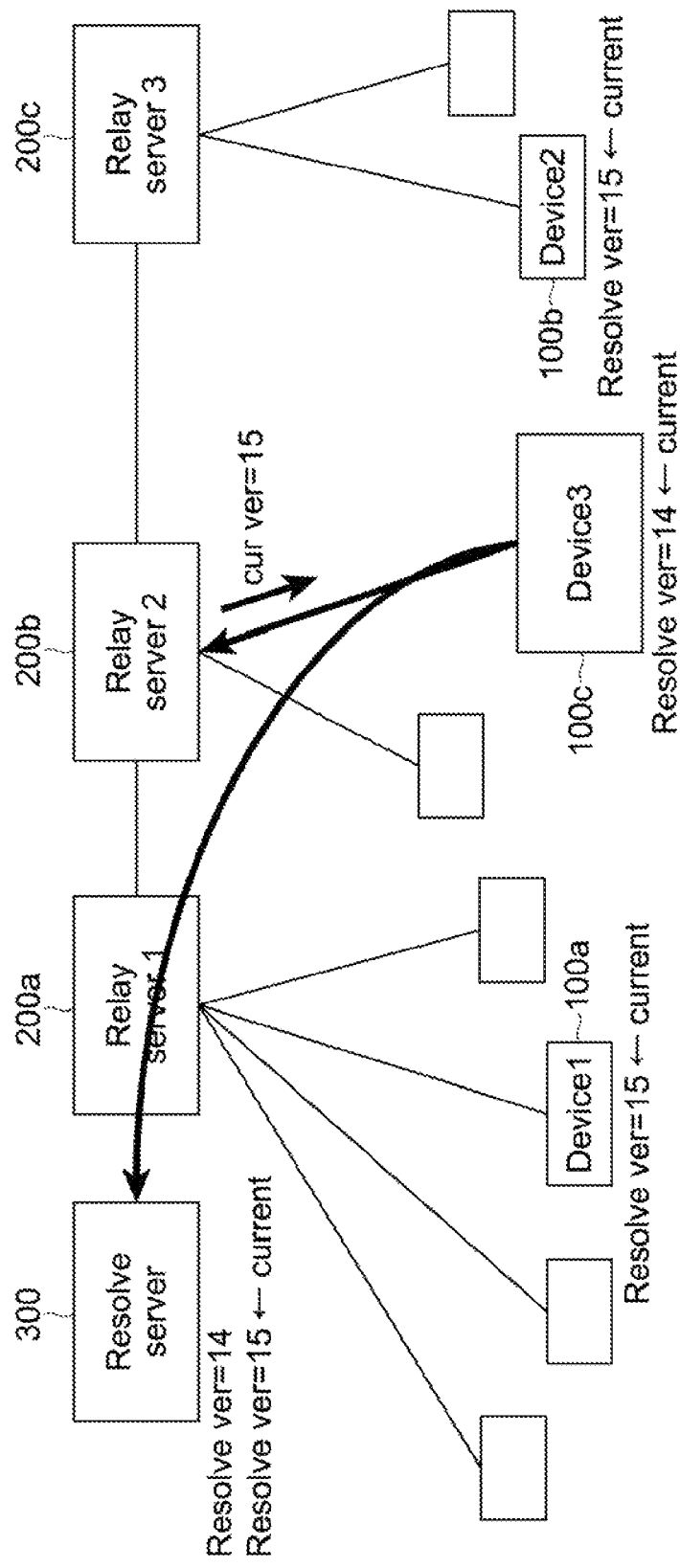
FIG. 12 is a diagram conceptually showing an operation in the case where the device is connected to the relay server after a long period of time of an unconnected state.

FIG. 12 is a diagram conceptually showing an operation in the case where the device 100 is connected to the relay server after a long period of time of an unconnected state. For example, there is assumed a case where the device 100 fails to receive a switching notification because its power is off when the switching notification is transmitted, and the device 100 is turned on thereafter.

As described with reference to FIG. 5 as well, the relay server 200 notifies the device 100 of the current version information of the Resolve data without fail in the negotiation with the device 100 when a communication path is established.

Thus, the device 100 can detect whether the version of its own Resolve data is different from the notified version. In such a case, the device 100 can immediately access the Resolve server 300 to acquire Resolve data of the "current" version, and switch the Resolve data to the acquired data.

In the example of FIG. 12, among the devices 100, only the device 100*c* fails to receive a notification of the switching of the Resolve data of ver=15 from "future" to "current" and retains the Resolve data of ver=14. However, it is found that when the device 100*c* is connected to the relay server 200 again, the device 100*c* receives a notification of ver=15 as a "current" version from the relay server 200 and detects, based on the notification, the fact that the switching is performed, and thus accesses the Resolve server 300 in order to acquire the Resolve data of ver=15 from the Resolve server 300.

[Conclusion]

As described above, according to this embodiment, also in the case where all of the devices 100 have to switch the Resolve data around the same time, the loads on the Resolve server 300 and the network due to the concentration of access can be reduced, when each device 100 acquires and retains updated Resolve data at a random time within the maximum standby time and switches the Resolve data after a notification is received from the relay server 200.

[Modified Example]

The present disclosure is not limited to the embodiment described above and can be variously modified without departing from the gist of the present disclosure.

In the embodiment described above, the relay server 200 designates the maximum standby time that elapses before the acquisition of the Resolve data, and each device 100 determines an optional time within the maximum standby time to be a standby time. However, the relay server 200 may determine and assign different standby times to the respective devices 100. In such a case, the update notification contains the determined standby time information, instead of the maximum standby time.

In the embodiment described above, the relay server 200 transmits the switching notification to the device 100 after the elapse of the maximum standby time, and thus the switching of the Resolve data is executed. However, in the case where the relay server does not transmit the switching notification and a predetermined switching time has come, the device 100 may automatically switch the Resolve data. In such a case, the update notification transmitted from the relay server 200 or the Resolve data acquired from the Resolve server 300 contains information on the switching time. Specifically, in this case, the data switching is executed by time management in the device 100.

In the embodiment described above, the Resolve data is acquired from the Resolve server 300, but it may be possible to transmit the Resolve data in advance from the Resolve server 300 to the relay server 200 and for the device 100 to acquire the Resolve data from the relay server 200.

In the embodiment described above, the Resolve data, that is, data on a relay server to be connected by each device 100 is regarded as an update target. However, the data to serve as an update target is not limited thereto. For example, various types of operation setting information of the respective devices 100, which are managed by the relay servers 200, may be regarded as update targets.

In the embodiment described above, in information on the Resolve data for update ("future"), only one version is transmitted from the relay server 200 at a time, and only one version is acquired from the Resolve server 300 at a time. However, it may be possible to transmit information on Resolve data of a plurality of versions for update ("future") and it may be possible for the device 100 to acquire the Resolve data of the plurality of versions for update ("future") from the Resolve server 300 at a time. In this case, different maximum standby times are set for each of the data of the respective versions for "future", and the data are sequentially updated. This allows the load on the Resolve server 300 to be more reduced.

Further, the present disclosure is also applicable to a system in which there are no relay servers 200 that mediate communication between the devices 100. Specifically, any data stored in the devices 100 can be an update target. For example, programs or applications installed in the devices 100 (for example, weather forecast information or coupon information) may be update targets, or key information used by the devices 100 for communication processing and the like may be an update target.

In the embodiment described above, the present disclosure is implemented with the hardware described with reference to FIG. 2 and the software modules shown in FIG. 3, but the present disclosure may be implemented by other hardware such as a dedicated circuit, instead of the software modules.

[Others]

The present disclosure can have the following configurations.

(1) An information processing apparatus, including:
a communication unit capable of communicating with a server;
a storage capable of storing data used for predetermined processing; and
a controller capable of
controlling the communication unit to
receive notification information from the server, the notification information containing current version information and updated version information, the current version information indicating a current version of the data, the updated version information indicating an updated version of the current version of the data, and
acquire the updated version from a predetermined storage location after waiting for a standby time optionally determined within a predetermined maximum standby time, and
controlling the storage to update the stored data to the acquired updated version after an elapse of the maximum standby time.

(2) The information processing apparatus according to (1), in which
the notification information contains maximum standby time information indicating the maximum standby time, and
the controller is capable of
optionally determining the standby time within the maximum standby time,
controlling the communication unit to receive update request information from the server after the elapse of the maximum standby time, the update request information requesting an update of the data, and
controlling the storage to update the data to the updated version based on the update request information.

(3) The information processing apparatus according to (1), in which
the notification information contains update time information indicating an update time of the updated version, and
the controller is capable of controlling the storage to update the data to the updated version when the update time comes.

(4) The information processing apparatus according to (2), in which
the controller is capable of controlling the communication unit to receive
the current version information from the server at a time of connection to the server next time, when the update request information fails to be received from the server because of being unconnected to the server,
comparing the version indicated by the current version information with a version of the data stored in the storage, and
controlling the communication unit to acquire the version of the data, the version being indicated by the current version information, from the storage location when the versions are different from each other, and
controlling the storage to update the stored data by the acquired version.

(5) The information processing apparatus according to any one of (1) to (4), in which
the controller is capable of controlling the communication unit to acquire the current version of the data from the storage location, when the information processing apparatus is activated and the storage does not store the data.

(6) The information processing apparatus according to any one of (1) to (5), in which
the server includes a relay server configured to relay communication between the information processing apparatus and a plurality of other apparatuses, the relay server including a plurality of relay servers, and
the data includes data indicating switching of a relay server to be connected for relay by the information processing apparatus, among the plurality of relay servers.

(7) The information processing apparatus according to any one of (1) to (6), in which
the controller is capable of
controlling the communication unit to receive information on a plurality of updated versions as the updated version information, the information on the plurality of updated versions containing at least information indicating an updated version of the current version of the data and information indicating a further updated version of the updated version, and
controlling the storage to update the data to the updated version after the elapse of different maximum standby times set for the respective updated versions.

It should be understood by those skilled in the art that various modifications, combinations, sub-combinations and alterations may occur depending on design requirements and other factors insofar as they are within the scope of the appended claims or the equivalents thereof.

What is claimed is:

1. A computer-implemented information processing method, the method comprising:
receiving notification information containing current version information and updated version information, the current version information indicating a current version of data used for predetermined processing, the updated version information indicating an updated version of the current version of the data;
acquiring the updated version from a predetermined storage location after waiting for a standby time optionally determined within a predetermined maximum standby time; and
updating the stored data to the updated version of the data after an elapse of the maximum standby time,
wherein
the notification information further contains maximum standby time information indicating the maximum standby time,
the standby time is optionally determined within the maximum standby time,
an update request information is received after the elapse of the maximum standby time, the update request information requesting an update of the data, and
the data is updated to the updated version based on the update request information.

2. A non-transitory computer-readable medium having embodied thereon a program, which when executed by a computer causes the computer to execute an information processing method, the method comprising:
- receiving notification information containing current version information and updated version information, the current version information indicating a current version of data used for predetermined processing, the updated version information indicating an updated version of the current version of the data;
- acquiring the updated version from a predetermined storage location after waiting for a standby time optionally determined within a predetermined maximum standby time; and
- updating the stored data to the updated version of the data after an elapse of the maximum standby time, wherein
- the notification information further contains maximum standby time information indicating the maximum standby time,
- the standby time is optionally determined within the maximum standby time,
- an update request information is received after the elapse of the maximum standby time, the update request information requesting an update of the data, and
- the data is updated to the updated version based on the update request information.

3. An information processing apparatus, comprising:
- a communication unit capable of communicating with a server;
- a storage having a memory capable of storing data used for predetermined processing; and
- a controller capable of
  - controlling the communication unit to
    - receive notification information from the server, the notification information containing current version information and updated version information, the current version information indicating a current version of the data, the updated version information indicating an updated version of the current version of the data, and
    - acquire the updated version from a predetermined storage location after waiting for a standby time optionally determined within a predetermined maximum standby time, and
  - controlling the storage to update the stored data to the acquired updated version after an elapse of the maximum standby time, wherein
- the notification information further contains maximum standby time information indicating the maximum standby time,
- the controller is capable of
  - optionally determining the standby time within the maximum standby time,
  - controlling the communication unit to receive update request information from the server after the elapse of the maximum standby time, the update request information requesting an update of the data, and
  - controlling the storage to update the data to the updated version based on the update request information, and
- the communication unit, the storage, and the controller are each implemented via at least one processor.

4. The information processing apparatus according to claim 1, wherein
- the notification information contains update time information indicating an update time of the updated version, and
- the controller is capable of controlling the storage to update the data to the updated version when the update time comes.

5. The information processing apparatus according to claim 1, wherein
- the controller is capable of
  - controlling the communication unit to receive the current version information from the server at a time of connection to the server next time, when the update request information fails to be received from the server because of being unconnected to the server,
  - comparing the version indicated by the current version information with a version of the data stored in the storage, and
  - controlling the communication unit to acquire the version of the data, the version being indicated by the current version information, from the storage location when the versions are different from each other, and
  - controlling the storage to update the stored data by the acquired version.

6. The information processing apparatus according to claim 1, wherein
- the controller is capable of controlling the communication unit to acquire the current version of the data from the storage location, when the information processing apparatus is activated and the storage does not store the data.

7. The information processing apparatus according to claim 1, wherein
- the server includes a relay server configured to relay communication between the information processing apparatus and a plurality of other apparatuses, the relay server including a plurality of relay servers, and
- the data includes data indicating switching of a relay server to be connected for relay by the information processing apparatus, among the plurality of relay servers.

8. The information processing apparatus according to claim 1, wherein
- the controller is capable of
  - controlling the communication unit to receive information on a plurality of updated versions as the updated version information, the information on the plurality of updated versions containing at least information indicating an updated version of the current version of the data and information indicating a further updated version of the updated version, and
  - controlling the storage to update the data to the updated version after the elapse of different maximum standby times set for the respective updated versions.

9. A server apparatus, comprising:
- a communication unit capable of communicating with a plurality of information processing apparatuses;
- a storage including a memory; and
- a controller capable of controlling the communication unit to
  - transmit notification information to the plurality of information processing apparatuses, the notification information containing current version information and updated version information, the current version information indicating a current version of data used for predetermined processing in the plurality of information processing apparatuses, the updated version information indicating an updated version of the current version of the data, the notification information making a notification of acquisition of the updated version after waiting for a standby time optionally determined within a predetermined maximum standby time, and transmit update request information to the plurality of information processing apparatuses after an elapse of the maximum standby time, the update request information requesting an update of the data by the updated version, wherein
the notification information further contains maximum standby time information indicating the maximum standby time, the controller is capable of controlling the communication unit to transmit the update request information after the elapse of the maximum standby time, the update request information requesting the update of the data, and the communication unit and the controller are each implemented via at least one processor.

* * * * *